United States Patent
Augst

(10) Patent No.: US 9,429,816 B2
(45) Date of Patent: Aug. 30, 2016

(54) CAMERA SYSTEM FOR A MOTOR VEHICLE

(75) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 872 days.

(21) Appl. No.: 12/273,372

(22) Filed: Nov. 18, 2008

(65) Prior Publication Data

US 2009/0135253 A1 May 28, 2009

Related U.S. Application Data

(63) Continuation of application No. PCT/EP2007/005323, filed on Jun. 16, 2007.

(30) Foreign Application Priority Data

Jun. 28, 2006 (DE) .................. 10 2006 029 892

(51) Int. Cl.
| | |
|---|---|
| *G03B 15/00* | (2006.01) |
| *B60R 1/00* | (2006.01) |
| *B60R 11/04* | (2006.01) |
| *G03B 37/00* | (2006.01) |
| *H04N 5/225* | (2006.01) |
| *H04N 5/232* | (2006.01) |
| *B60R 11/00* | (2006.01) |

(52) U.S. Cl.
CPC ............... *G03B 15/00* (2013.01); *B60R 1/00* (2013.01); *B60R 11/04* (2013.01); *G03B 37/00* (2013.01); *H04N 5/2259* (2013.01); *H04N 5/23293* (2013.01); *B60R 2011/004* (2013.01); *B60R 2300/108* (2013.01); *B60R 2300/301* (2013.01); *B60R 2300/404* (2013.01); *B60R 2300/607* (2013.01); *B60R 2300/70* (2013.01); *B60R 2300/8066* (2013.01); *B60R 2300/8093* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 5,073,417 A | * | 12/1991 | Bowerman ...................... | 428/31 |
| 5,262,210 A | * | 11/1993 | Sellers et al. .................. | 428/31 |
| 5,288,557 A | * | 2/1994 | Perlman et al. ................ | 428/31 |
| 5,295,021 A | * | 3/1994 | Swanson ...................... | 359/850 |
| 5,316,808 A | * | 5/1994 | Prunty ........................... | 428/31 |
| 5,424,875 A | * | 6/1995 | Davis, II ...................... | 359/850 |
| 5,456,958 A | * | 10/1995 | Crisler .......................... | 428/31 |

(Continued)

FOREIGN PATENT DOCUMENTS

| | | |
|---|---|---|
| DE | 100 13 425 A1 | 9/2001 |
| DE | 100 31 590 A1 | 1/2002 |

(Continued)

OTHER PUBLICATIONS

International Search Report dated Nov. 8, 2007 with English translation (Six (6) pages).

(Continued)

*Primary Examiner* — Richard G Keehn
(74) *Attorney, Agent, or Firm* — Crowell & Moring LLP

(57) ABSTRACT

In the case of a camera system for a motor vehicle, incident radiation can be guided by way of one or more deflection mirrors to a camera, at least one deflection mirror being structurally coupled with a swivelable decorative part of the motor vehicle.

18 Claims, 5 Drawing Sheets

(56) References Cited

U.S. PATENT DOCUMENTS

| | | | | |
|---|---|---|---|---|
| 6,476,855 B1* | 11/2002 | Yamamoto | | 348/148 |
| 6,831,556 B1* | 12/2004 | Boykin | | 340/539.1 |
| 7,025,467 B2* | 4/2006 | Meyer et al. | | 359/843 |
| 7,183,944 B2* | 2/2007 | Gutta et al. | | 340/937 |
| 2001/0055214 A1* | 12/2001 | Chang | | 362/494 |
| 2002/0003571 A1* | 1/2002 | Schofield et al. | | 348/148 |
| 2002/0113415 A1 | 8/2002 | Pochmuller | | |
| 2003/0021041 A1 | 1/2003 | Bos | | |
| 2003/0081123 A1* | 5/2003 | Rupe | | 348/148 |
| 2003/0085999 A1* | 5/2003 | Okamoto et al. | | 348/148 |
| 2003/0112132 A1* | 6/2003 | Trajkovic et al. | | 340/435 |
| 2003/0218812 A1* | 11/2003 | Foote et al. | | 359/874 |
| 2004/0114039 A1* | 6/2004 | Ishikura | | 348/148 |
| 2004/0257686 A1* | 12/2004 | Meyer | | 359/872 |
| 2005/0073436 A1* | 4/2005 | Negreiro | | 340/937 |
| 2005/0179527 A1* | 8/2005 | Schofield | | 340/435 |
| 2006/0170910 A1* | 8/2006 | Almogy et al. | | 356/237.1 |

FOREIGN PATENT DOCUMENTS

| | | |
|---|---|---|
| DE | 10 2004 039 450 A1 | 3/2006 |
| EP | 1 004 916 A1 | 5/2000 |
| JP | 58-194640 A | 11/1983 |
| JP | 3-182848 A | 8/1991 |
| JP | 2001-122020 | 5/2001 |
| JP | 2004-82778 A | 3/2004 |
| KR | 10-2006-0005302 | 1/2006 |

OTHER PUBLICATIONS

German Search Report dated Apr. 24, 2007 with English translation (Thirteen (13) pages).

* cited by examiner

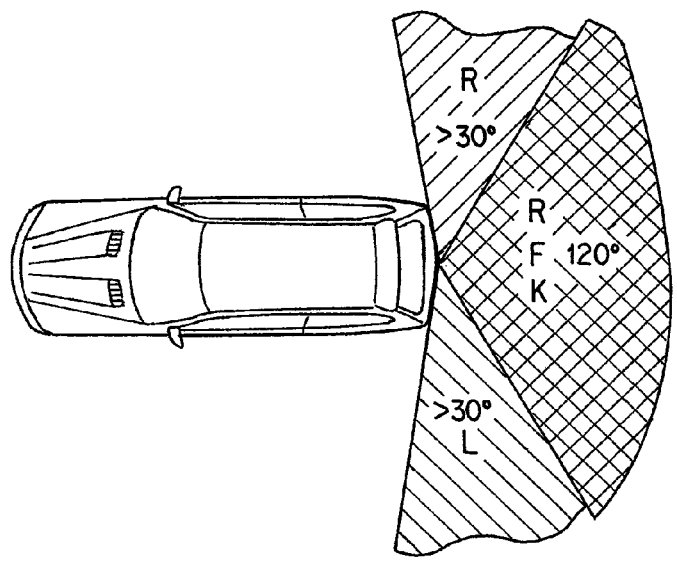
Fig. 6
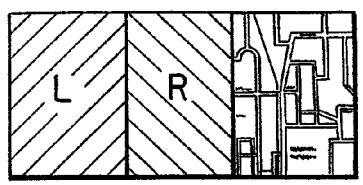  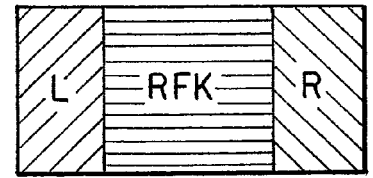
Fig. 7a Fig. 7b Fig. 7c

CAMERA SYSTEM FOR A MOTOR VEHICLE

CROSS-REFERENCE TO RELATED APPLICATIONS

This application is a continuation of PCT International Application No. PCT/EP2007/005323, filed Jun. 16, 2007, which claims priority under 35 U.S.C. §119 to Germany Patent Application No. DE 10 2006 029 892.6, filed Jun. 28, 2006, the entire disclosures of which are herein expressly incorporated by reference.

BACKGROUND AND SUMMARY OF THE INVENTION

The invention relates to a camera system for a motor vehicle.

Camera systems of this type are known particularly in connection with camera-based driver assistance systems in modern motor vehicles. In the case of many systems of this type, the pictures or videos taken by a camera are presented to the driver of the motor vehicle in their original or in a processed form.

A typical case of a camera system for a camera-based driver assistance system is represented by a so-called rear camera for taking pictures and/or videos of the rear space of a motor vehicle.

It is known to structurally mount such a rear camera on the motor vehicle such that, particularly while it is not in use, it is protected from dirt and/or damage and, if possible, is physically partitioned off from the environment. For this purpose, there are, for example, mechanical solutions using a mechanically openable proprietary symbol and a mechanically extensible camera. This manner of mounting a camera on the motor vehicle is also known from German patent document DE 10013425 A1.

However, such a system has several disadvantages. On the one hand, the space conditions for the camera and the electronic system assigned to it are extremely limited in the case of such a solution. For reasons of cost (for example, because of the then required transmission link between the camera and the electronic image processing system), a basically conceivable spatial separation of the camera from its assigned electronic image processing system is not desirable. On the other hand, depending on the embodiment, such an arrangement may imply a large number of movable parts which may be subject to wear, jamming or also freezing. Finally, the high-expenditure mechanism and the required compact optronics result in considerable costs.

As a function of the respective use, however, the demands on a camera system for a camera-based driver assistant system vary greatly, particularly with respect to the alignment and the aperture angle of the camera, and are not easily compatible. For solving such problem situations, according to the methods and systems known from the state of the art, several cameras or objectives would be required on the rear of the motor vehicle alone. This causes high costs, results particularly in constructive difficulties and, impairs—since several openings would have to be provided in the skin of the motor vehicle—among other things, the vehicle exterior. In order to avoid the disadvantages that would be the result of the mounting of several cameras or objectives, attempts are made again and again to take pictures for several image processing systems by means of a single camera or a single objective. However, it would be necessary for such an objective to have, for example, an extremely wide aperture angle of over 180 degrees in order to meet the demands of different systems. As a rule, an objective with such an aperture angle has extreme spherical distortions which cannot be sufficiently corrected electronically because electronic correcting devices do not supply satisfactory results in the case of such large aperture angles. Particularly in the edge regions, the picture quality is additionally considerably reduced on the basis of the decreasing solid-angle resolution and the optical edge shading. In addition, objectives with such an aperture angle are available, if at all, only at very high costs.

A basically also contemplated system with mechanically changeable objectives (compare a microscope) can hardly be used in an economically meaningful manner in the automatic field because of the required robust and simultaneously precise mechanics.

It is an object of the invention to create a cost-effective and robust camera system for a motor vehicle, which can be used in several applications shaped by different demands.

According to the invention, this object is achieved by a camera system for a motor vehicle, wherein the incident radiation can be directed by way of one or more deflection mirrors to a camera, at least one deflection mirror being structurally coupled to a pivotable trim piece of the motor vehicle. Preferred embodiments and advantageous further developments of the invention are described herein.

According to the invention, incident radiation can be directed to the camera by way of one or more deflection mirrors. By the use of one or more deflection mirrors, the camera including the pertaining electronic image processing system can be fixedly mounted in the interior of the vehicle at a suitable location. The camera is preferably arranged at a point where either sufficient space is available or space can be created by means of justifiable expenditures. Only at least one of the deflection mirrors used has to be arranged on the, or close to, the skin of the motor vehicle body. In this manner, the camera can be well protected from external influences, such as precipitation, splashing water and rocks. An improved protection against cold/hot temperatures can also be achieved in this manner. In addition, in comparison to a mounting of the camera on the skin of the motor vehicle body, the requirements with respect to the maximal dimensions of the camera are lower, and no spatial separation between the camera and the electronic system is necessary.

According to the embodiment of the invention, one or more deflection mirrors can be used for deflecting the incident radiation to the camera.

The skin of the motor vehicle body should have an opening through which the radiation, which is to be directed to the camera, can enter. Depending on the embodiment of the invention, the deflection by the deflection mirror can take place before, during, or after the radiation enters through this opening. However, in the simplest case, only a single opening for the camera system according to the invention has to be provided in the skin of the motor vehicle body. This should be considered to be an advantage for several reasons. Openings in the skin frequently promote the entering of moisture into the body of the motor vehicle. They may cause aerodynamic impairments. In addition, they may impair the outside appearance of the motor vehicle.

In that, as the invention provides, at least one deflection mirror is structurally coupled to a pivotable decorative part, a construction can be achieved in the case of which, in addition, the disadvantages of the single opening in the skin of the motor vehicle body required for the invention are avoided or minimized.

The opening in the skin of the motor vehicle body can preferably be largely or completely covered by the decorative part. The esthetic disadvantages of such an opening in the skin can thereby be avoided or minimized. In addition, the aerodynamic disadvantages of such an opening in the vehicle body skin can be avoided or minimized. Furthermore, the entering of dust and moisture can also be effectively prevented in the case of a suitable construction.

According to the embodiment, many different decorative parts on a motor vehicle can be used for the implementation of the invention, for example, proprietary symbols, a molding, or a part thereof. Many modern motor vehicles are equipped with moldings, for example, in a chrome style, particularly in the rear area. A structural coupling to a handle bar, for example, a handle on the tailgate, is also contemplated. A decorative part is preferably selected which, in the normal operation—at least in the direction of the pivoting or swiveling according to the invention—, is not acted upon by large forces or moments. For example, in the case of a structural coupling to a handle on a tailgate, the latter, for purposes of opening the tailgate, should not be acted upon by forces or moments in the same direction into which it can be swiveled for the purposes of the invention. Particularly for a small moved mass, the decorative part should advantageously be dimensioned to be relatively small and light. When the invention is used in connection with a molding, the solution therefore presents itself of dividing the molding into sections and to swivel only one of these sections for the purposes of the invention.

The decorative part preferably is a proprietary symbol. In this case, a proprietary symbol should be understood to be an identification sign on a motor vehicle which typically graphically, symbolically and/or by a text points out the manufacturer of the motor vehicle (for example, "BMW Propeller", "Mercedes Star", etc.). However, a proprietary symbol within the context of the invention is, for example, also an identification sign which indicates a vehicle model, a vehicle series, or another fact (for example, a vehicle owner or leasing company). Such proprietary symbols, particularly those indicating the manufacturer, are frequently constructed as a separate component on modern motor vehicles, for example, as a plaque. Such a proprietary symbol typically has an essentially flat or slightly outwardly curved image side. This image may, for example, show the actual graphic, symbolic and/or text-type reference to the manufacturer, for example, as an imprint. Conventional proprietary symbols are typically mounted on the respective motor vehicle such that the image side points to the vehicle exterior.

Also, a proprietary symbol used in the case of the invention has an image side that can be turned to the vehicle exterior. The proprietary symbol used in the case of the invention can preferably be moved into at least two different stable swiveling positions by means of a suitable swiveling. In a first stable swiveling position (in the following, also called function position), incident radiation is, in fact, directed to the camera by way of the deflection mirror coupled to the proprietary symbol. In a second swiveling position (in the following, called rest position), the image side of the proprietary symbol is turned to the vehicle exterior.

Other decorative parts to be considered for the invention also have a decorative side corresponding to the image side of a proprietary symbol. According to a preferred embodiment of the present invention, the decorative part has an essentially flat construction and carries the deflection mirror on a side situated opposite the decorative side. In the case of a proprietary symbol, the proprietary symbol therefore preferably has a flat construction and carries the deflection mirror on its backside (if the image side is defined to be the face).

The use of the proprietary symbol as the decorative part in the context of the invention is particularly advantageous because of the, as a rule, largely flat shape of a proprietary symbol, because of the, as a rule, central as well as exposed mounted position of a proprietary symbol on the vehicle, and because of the typical shape and size of a proprietary symbol, which correspond approximately to that of a deflection mirror suitable according to technical aspects.

For the benefit of a clear representation without limiting the generality, the further description of the invention is based on the assumption that the decorative part is a proprietary symbol. The person skilled in the art understands, however, that many of the characteristics of the invention described in the following can easily be applied to the case of a structural coupling of the deflection mirror to a different structural part and the same or similar advantages are obtained. To the extent that it can apply, the case of different decorative parts should therefore also be considered to be disclosed.

The swiveling of the proprietary symbol is preferably carried out by a suitable drive unit (such as an electric motor).

For the swiveling, the proprietary symbol is preferably rotated about an axis. The axis of rotation preferably is a horizontal axis extending, for example, through the center of gravity of the proprietary symbol. A low torque will then be required for the rotation of the proprietary symbol, and the stabilization of the proprietary symbol in a certain swiveling position requires a low holding moment. While a locking effect is utilized, the stabilization, as required, may even take place without any targeted effect of forces or moments.

Within the context of the invention, the term "swiveling" does not only apply to a pure rotation. The term should rather be interpreted in a broad fashion. A swiveling in the sense of the invention should, for example, also include a folding motion or a similar motion during which the spatial orientation of the proprietary symbol is changed. The swiveling may also take place about more than one axis, and it can be caused by several drive units.

Preferably, the proprietary symbol, the structural coupling of the deflection mirror to the latter, and the swiveling mechanism for the swiveling of the proprietary symbol, are designed such that the proprietary symbol can be swiveled such that the appearance of the proprietary symbol mounted on the motor vehicle in the rest position resembles the appearance of a conventional proprietary symbol. When not in use, the camera and the deflection mirror can then not only remain protected but also remain completely invisible. An impairment of the external appearance of the motor vehicle is thus avoided. Advantageously, people not associated with the vehicle cannot see whether the motor vehicle is even equipped with a camera system according to the invention. The risk of theft or of willful damage is thereby reduced.

Preferably, the proprietary symbol, the structural coupling of the deflection mirror to the latter, and the swiveling mechanism for the swiveling of the proprietary symbol, are designed such that the proprietary symbol can be swiveled such that an interference with the aerodynamics of the motor vehicle by the proprietary symbol in the rest position is not greater than the interference from a conventional proprietary symbol. In particular, the proprietary symbol according to the invention in the rest position is to place itself closely against the skin of the vehicle body like a conventional proprietary symbol. As a result, particularly when the camera system according to the invention is not in use, an impairment of the aerodynamics of the motor vehicle can be avoided.

In the rest position of the proprietary symbol, a sealing device preferably prevents dust and/or moisture from entering into the opening in the skin of the motor vehicle body covered by the proprietary symbol.

When several deflection mirrors are used, preferably only the deflection mirror most remote from the camera in the light path is coupled to the proprietary symbol. The remaining deflection mirrors can then—like the camera—also be situated in the vehicle interior in a protected manner. In addition, the structural coupling of only one deflection mirror to the proprietary symbol has a relatively simple design. Furthermore, the mass to be moved during swiveling is minimized.

As initially explained, it is known from the state of the art, particularly from German patent document DE 10013425 A1, to mount a camera for detecting the environment in the case of a motor vehicle "behind" a proprietary symbol. As a result, mainly the position of a proprietary symbol on a motor vehicle that is favorable for taking pictures is optimally utilized. In comparison, the invention has the significant improvement that a deflection mirror is structurally coupled to such a proprietary symbol or another decorative part. Important advantages of the use of a deflection mirror were explained above. For example, the use of a deflection mirror frees up considerable options (for example, with respect to the installation direction and the installation space) for the mounting of the camera. Thus, an oblong shaped camera can be installed, for example, also transversely if sufficient space is not available in the longitudinal direction. The incident radiation has to be directed to the camera only by way of suitable reflections. Also, particularly in the case of front cameras, the danger of rock and stone damage can be reduced; for, instead of frontally aligning the camera in an unprotected manner, even in the function position, only the deflection mirror is exposed to this danger while the camera in the vehicle interior, to which the mirror directs the radiation, is not exposed to any direct stone throw.

In addition, if required, an exchange of the deflection mirror is significantly easier and more cost-effective than an exchange of the camera. It should also be considered that, in the case of an appropriate embodiment of the invention, an exchange of the deflection mirror can take place without any intervention into the electronic system of the motor vehicle.

Furthermore, if, in addition to the deflection of the incident radiation, the deflection mirror also causes an optical imaging, merely by the use of different deflection mirrors, very different picture taking functions can be implemented.

In the rest position, even the deflection mirror can be effectively protected because, in the rest position, not the deflection mirror, but rather the image side of the proprietary symbol points to the vehicle exterior. In the case of the invention, the two components significantly contributing to the picture quality (the deflection mirror and the camera) can therefore largely remain protected.

A further significant advantage of the invention over the devices known from the state of the art is the fact that the effect of the deflection mirror structurally coupled to the proprietary symbol is not necessarily limited to a pure deflection. On the contrary, the deflection mirror can already fulfill an optical imaging function. According to a preferred embodiment of the present invention, the deflection mirror correspondingly is not only flat but, corresponding to a desired optical imaging function, has a curved design (for example, a wide-angle view). For this purpose, the deflection mirror may be further developed such that the distortions introduced by a wide-angle lens system as a result of its principle are avoided or corrected out. The solid angle as well as the optical imaging function can be modeled by means of a specially curved mirror. A trapezoidal image transformation is also contemplated for a special form of image correction by means of a special curvature of the deflection mirror.

In principle, as a result of a suitable curvature course of the deflection mirror, an optical imaging function can also be formed, which shows certain picture areas (for example, trailer coupling or other points of concentration) in an enlarged fashion. The latter can be displayed either as a picture within a picture having a boundary or as a no-transition location-dependent enlargement. The effect can thereby be generated for the viewer that the picture is enlarged in a certain part, for example, in the lower region of the field of view, in comparison to the remaining picture area. A comparable effect can be implemented, for example, in the case of special reading glasses by means of special lenses. The enlargement or emphasizing of certain picture areas can contribute to a better visibility of the environmental information for the driver and/or for an automatic picture analysis. The enlarged area can preferably be varied by a variation of the swiveling position of the proprietary symbol.

Even a deflection mirror constructed at high expenditures can be cost-effectively provided in contrast to another comparable, for example, particularly wide-angled lens system and/or the image processing devices required for a corresponding electronic image distortion or image distortion correction.

The device according to the invention permits a virtual transformation of the viewing perspective of the camera. This may, for example, be a "top view" transformation. In the case of the latter, the video picture taken from the rear perspective, in order to achieve clarity for the driver, is transformed to a picture apparently taken from above. According to the state of the art, this is implemented electronically and requires hardware resources which can be saved when a device according to the invention is used and, as a result of the latter, a corresponding transformation is achieved.

With respect to all described optical transformations, the device according to the invention has a basic advantage in comparison to electronic image transformation methods used according to the state of the art because the optical transformations in the case of the device according to the invention take place without any delay. The delay time of, for example, approximately 30 milliseconds, which is required for an optical transformation in the case of many electronic methods and devices according to the state of the art, is added to an eventual sensor and display reaction time and is therefore not negligible and extremely disturbing in some situations in street and highway traffic. In contrast, the device according to the invention is absolutely capable of operating in real-time.

According to a preferred embodiment of the invention, the deflection mirror and the remaining components of the camera system are further developed such that, by a change of the swiveling position of the proprietary symbol, a change of the optical imaging can be caused, which is the result of the deflection mirror. Different optical effects can thereby be achieved depending upon the swivel position of the proprietary symbol.

According to a particularly preferred embodiment of the invention, the deflection mirror is designed such that its entire surface is not simultaneously required for the deflection of the incident radiation, but in each case, only a portion or cutout of the surface. The swivel mechanism can then be designed such that, as a result of a change of the swivel position of the proprietary symbol, another cutout of the surface of the deflection mirror steers the incident radiation to the camera. Then, the entire surface of the deflection mirror, particularly its curvature, can again be designed such that, as a result of a change of the swivel position of the proprietary symbol, a change of the optical image is obtained which is caused by the deflection mirror. In particular, the surface of the deflection mirror can be designed such that, as a result of a continuous change of the swivel position of the proprietary symbol, a continuous change of the optical effect is caused, for example, from wide-angled to narrow-angled, which is the result of the deflection mirror.

As an alternative or in addition, by way of a continuous change of the swivel position, the direction can be changed from which incident radiation is directed to the camera. Instead of swiveling the camera, the proprietary symbol can then be swiveled in order to vary the effective viewing direction of the camera. This is advantageous particularly because the proprietary symbol can have a significantly smaller and lighter construction than the camera and can therefore be swiveled more easily.

A device which, as a result of a change between several discrete swiveling positions, permits a change between various optical effects can also very easily be implemented constructively and is therefore advantageous. The case in which a change between two different optical effects takes place as a result of a change between two discrete swivel positions can be mastered particularly easily from a constructive point view. As a result of a change of the swivel position, for example, either a wide-angle view or an enlarged view can then be adjustable.

For this purpose, the deflection mirror structurally coupled to the proprietary symbol has a first mirror surface suitable for the deflection of incident radiation and at least a second mirror surface also suitable for the deflection of incident radiation, the second mirror surface having a curvature course that differs from the first mirror surface, and the proprietary symbol being swivelable such that incident radiation can be directed optionally from the first or the second mirror surface to the camera. By using each of the two mirror surfaces, a defined optical effect can be achieved as a result of the respective course of the curvature. By swiveling the proprietary symbol, adjustments can be made as to which of the two mirror surfaces steers the incident light to the camera; i.e., which of the two mirror surfaces is "active".

In this case, the proprietary symbol can preferably optionally be moved into at least three different swivel positions: the rest position and two different function positions—one for each achievable optical effect. Mechatronically, the camera system will then have a tri-stable construction. In such a case, the deflection mirror is preferably structurally coupled to the proprietary symbol such that the image side of the proprietary symbol and the two mirror surfaces are each offset with respect to one another by approximately 120 degrees. For achieving a flatter design, the angle between the two mirror sides may be designed to be more obtuse with respect to the latter, and the two other angles are designed to be correspondingly more acute.

When the construction and, as required, the swiveling mechanism are suitable, the principle described above for two mirror surfaces can also be applied to a larger number of mirror surfaces (for example, n mirror surfaces, n+1 stable swivel positions).

As an alternative to the above-described design with several mirror surfaces having different courses of curvature, a design is also contemplated in the case of which, although at least two mirror surfaces have the same or a similar course of curvature, the overall arrangement is constructed such that the mirror surfaces, when they are in use, are each arranged differently relative to the camera objective. Also in this manner, different optical effects can be achieved as a result of the use of the individual mirror surfaces.

According to another preferred embodiment of the invention, the radiation from several, in reality not mutually adjoining, scenes can also be directed at the same time to the camera such that, in the case of this camera, they are imaged adjacently. This can be implemented by a suitable course of the curvature of the deflection mirror or of one of the mirror surfaces—if the deflection mirror has several mirror surfaces. For example, two lateral views (looking away from the vehicle essentially or approximately perpendicular to the driving direction) can be taken by means of the same camera at the same time—combined into a common picture. Likewise, two lateral views and one view toward the rear (looking away from the vehicle essentially against the driving direction) could be imaged by means of the same camera at the same time. In this manner, the functionality of one or more laterally aligned cameras as well as of one rear camera can be achieved by a camera system having only a single camera, without requiring the camera to be mounted in an exposed manner and/or to be swiveled itself.

The respective deflection mirror or the respective mirror surface of the deflection mirror—particularly in the case of such an embodiment of the invention—may be constructed as a deflection prism (or as a combination of a deflection prism and at least one additional mirror element). Likewise, the deflection mirror or at least one of the mirror surfaces of the deflection mirror may be further developed as a combination of several (for example, three) mirror parts or surface parts. Depending on the requirements, each mirror part or surface part of this type can also be further developed to be curved for achieving additional optical effects.

As outlined above, such an assembled view can also be achieved by one of several mirror surfaces, which are part of the deflection mirror and which each cause a certain optical effect. A change can thereby also be achieved between an assembled view (mirror surface with several surface parts) and a view that is not assembled (mirror surface having only one surface part). For example, optionally—depending on the swiveling position—either a wide-angled view of the environment with a rearwardly oriented optical axis or a picture divided into two parts with two lateral views could be imaged.

The present description is based on the definition that a deflection mirror may have several mirror surfaces. For technological reasons, it may be advantageous for such a deflection mirror to be constructed as a single component having several mirror surfaces. This component then preferably has a surface which has the spatial shape of a hypersurface assembled of the individual mirror surfaces. This surface may be completely or partially mirror-coated. Likewise, however, a deflection mirror with several mirror surfaces according to the above description may also consist of several components. For example, each mirror surface may be formed by a separate mirror element.

The image processing steps required for the further processing and display of the video signals taken by the camera, such as reflection, windowing and display of a combination of several video images on a video screen are known in a different context from the state of the art and can be mastered by modern automotive image processing systems.

According to the same principle, the device according to the invention permits the joint use of the rear camera image by a tracking (lane departure) assistant which requires, for example, a relatively narrow-angled view in the driving direction. Such a view for a tracking assistant can also at least partially be produced on the basis of a backward or backward-sideways-oriented camera. Selected image characteristics recognized by way of optical object recognition, particularly markings of roadways, in this case, are virtually continued in the driving direction. Such a tracking assistant can be used particularly at high driving speeds because the assumption of a relatively straight course of the roadway markings can then be justified.

In addition, the invention is suitable for a use in connection with many other automotive image processing systems. Further examples are a so-called "blind-spot detection" or an automatic collision warning based on object recognition.

The swivelability of the proprietary symbol according to the invention can, as mentioned above, be brought about, for example, by use of a torque motor. Advantageously, it can also be achieved by way of an electromagnetic actuator and various predefined lockable swiveling positions. By using lockable swiveling positions, the proprietary symbol can be moved very precisely into the respective swiveling position without requiring a precise (and therefore expensive) actuator for this purpose.

In the case of a mechatronically tri-stable camera system according to the invention, a swiveling mechanism for the proprietary symbol can then, for example, be provided where, for each of the three system conditions that can be taken up ("image side to the vehicle exterior, camera off", "wide-angle reversing camera", "combined picture of two lateral views"), the proprietary symbol can lock into a corresponding swivel position.

Switching between such system conditions can take place, for example, as a function of MMI commands originating from the driver of the motor vehicle. It can also take place completely or partially automatically (by means of the current gear position, the current speed, etc.).

The switching of the system conditions can preferably also take place by use of the signals of other environment-detecting sensors of the vehicle, for example, by means of the signals of a Park Distance Control (PDC). When the ultrasonic sensor system of the PDC detects an obstacle, such as a post or a person in the center behind the vehicle, while the camera system is in the "combined picture of two lateral views" condition, advantageously a change-over automatically takes place in the "wide-angle reversing camera" condition in order to make the obstacle recognizable in the camera picture and to inform the user of the collision danger.

For the change-over, essentially only the proprietary symbol has to be swiveled from the swiveling position pertaining to the "combined picture of two lateral views" system condition into the swiveling position pertaining to the "wide angle reversing camera" system condition. This can take place very easily and rapidly. To this extent, the invention also offers an advantage with respect to speed in comparison with the solutions using extensible objectives according to the state of the art because the latter cannot be moved out so rapidly in the event of a sudden demand. The reason for this advantage is, among other things, that the weight of the moved parts in the case of the invention is drastically reduced in comparison with the state of the art. The boot time, which is frequently required in the methods and devices according to the state of the art (or the time for another activation of an additional control device) can be eliminated in the case of the invention, because preferably several image-processing systems, particularly driver assistance systems, can access the camera system according to the invention. In the simplest case, the camera system according to the invention has only a single control device.

According to a further development of the invention, results of the evaluation or interpretation of an electronic map (for example, the map of a navigation system), preferably in combination with data concerning the position of the motor vehicle, can be used for the fully automatic or partially automatic control of the camera system. Should, for example, according to the interpretation of the map data, the display of lateral views make sense (in the case of a proprietary symbol arranged on the rear of the vehicle, for example, when the motor vehicle, in the rearward driving position, approaches a street junction) the camera system can automatically carry out a switching into a certain system condition (for example, "combined picture of two lateral views") or suggest such a change-over to the driver. This can, for example, take place in that optical and/or acoustic information is emitted upon which the driver can acknowledge the suggested change-over by an operating action.

The above descriptions and examples predominantly relate to a camera system in the case of which the proprietary symbol is arranged on the vehicle's rear end. The camera can then, among other uses, also be used as a reverse drive camera. However, a device according to the invention exhibits the same or similar advantages also at other mounting sites, particularly in connection with a proprietary symbol on the vehicle's front end.

An important advantage of the use of a proprietary symbol as a decorative part according to the invention is the fact that, as a rule, the proprietary symbol of a motor vehicle is arranged in a very exposed manner. This applies to the buildup height as well as to the protrusion on the respective buildup height. The mounting according to the invention to a proprietary symbol therefore provides an excellent effective perspective for taking pictures.

The use of a proprietary symbol as a decorative part in the context of the invention additionally permits a central arrangement of the camera on the motor vehicle because proprietary symbols are typically arranged in the vehicle center. In many cases, this results in excellent picture quality, and particularly simple image processing is made possible. In the case of devices according to the state of the art, for constructive reasons, the camera usually has to be arranged spaced away from the center axis of the motor vehicle. Without further measures, this frequently results in an asymmetry of the image taken. The asymmetry can partly not be corrected, which results in a poor quality of the image. A later correction of such asymmetry by image processing methods—if possible at all—requires high expenditures and may cause further delays.

In addition to the above-mentioned technical advantages, the structural coupling of the deflection mirror to a proprietary symbol also has the advantage that the swiveling of the proprietary symbol, during the operation of the camera system according to the invention, which can also be observed by not participating persons—depending on the observer's interests—may represent an impressive technical operation. It is highly probable that the respective observer will directly link this technical operation to the vehicle manufacturer identified by the proprietary symbol.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 is a schematic view of an example of the fields of view covered by the individual surface parts of a mirror surface on a deflection mirror;

FIG. 7a is a schematic view of a first video screen view for visualizing individual covered fields of view;

FIG. 7b is a schematic view of a second video screen view for visualizing individual covered fields of view;

FIG. 7c is a schematic view of a third video screen view for visualizing individual covered fields of view.

DETAILED DESCRIPTION OF THE DRAWINGS

Figure 1:
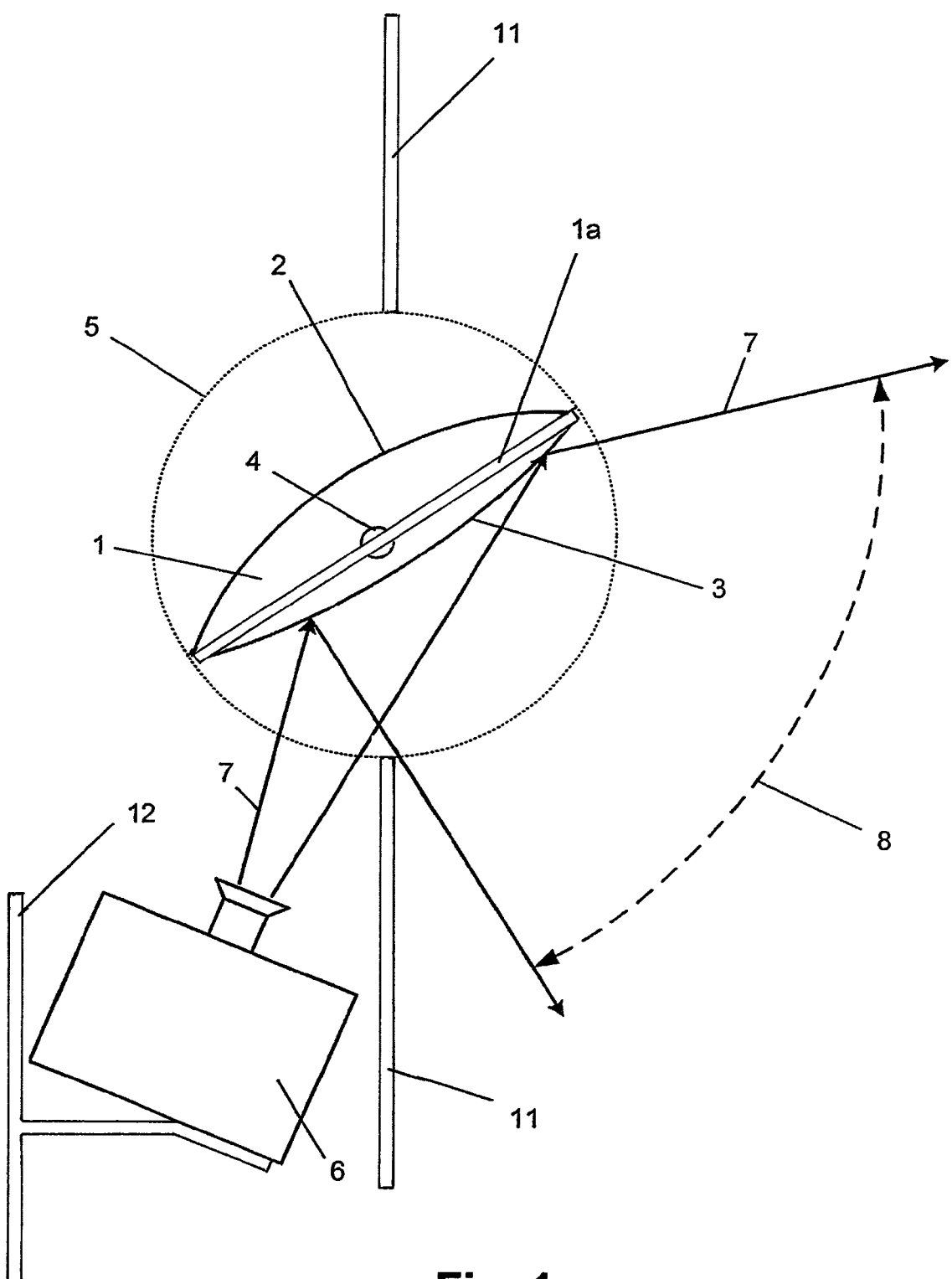
FIG. 1 is a schematic cross-sectional view of a first camera system according to the invention.

FIG. 1 is a cross-sectional view of a first camera system according to the invention. A camera 6 is provided for monitoring a field of view 8 in the rear space of a motor vehicle. The camera 6 is mounted in a protected manner in the interior of the motor vehicle behind an outer panel 11, which, here, is part of a tailgate. The camera 6 itself is fixed to a vehicle body part 12, which here is also part of the tailgate. The outside panel 11 has an opening in which, rotatably about an axis of rotation 4, a proprietary symbol 1 is disposed.

The proprietary symbol 1 is dimensioned such that it can tightly close off the opening in the outside panel 11 in a suitable swiveling position. The tight closure is aided by a sealing device, which extends around the opening in the outside panel 11 and is not separately shown graphically. The circle 5 in FIG. 1 illustrates the dimensioning of the proprietary symbol 1 suitable for closing off the opening. The proprietary symbol 1 is rotated about the axis 4 by way of a rotary actuator, which rotary actuator is not separately shown graphically.

The proprietary symbol 1 first includes a carrier plate 1*a* and a plaque mounted on the carrier plate 1*a*. On the image side 2, the plaque carries the logo of the manufacturer of the motor vehicle. When the proprietary symbol is appropriately rotated, the image side 2 can be turned to the vehicle exterior.

For taking pictures by means of the camera 6, light can be reflected from the angular traverse of the field of view 8 to the camera 6. For this purpose, a deflection mirror 3 is mounted on the backside of the proprietary symbol, i.e., on the side situated opposite the image side. The arrow lines 7 between the camera and the mirror, as well as from the mirror to the vehicle exterior, illustrate the reflection of incident light from the vehicle exterior in the field of view 8 into the camera 6. The surface of the deflection mirror 3 is curved such that a relatively wide-angled view is obtained in the present example.

The axis of rotation 4 extends approximately through the center of gravity of the proprietary symbol 1 together with the plaque and the reflection mirror 3, whereby only a very low torque is required to swivel the proprietary symbol or for holding the symbol in a certain swivel position.

Figure 2:
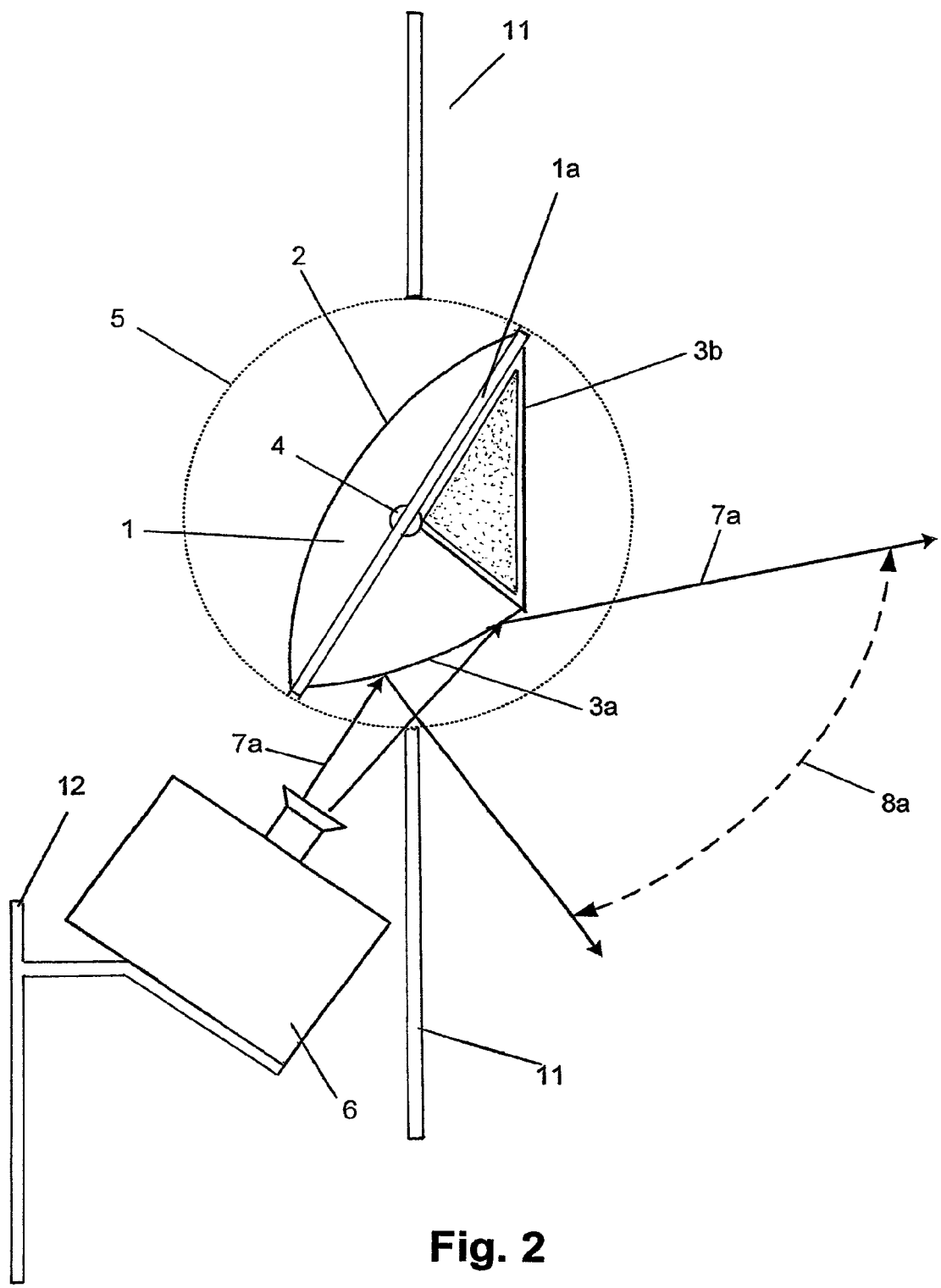
FIG. 2 is a schematic cross-sectional view of a second camera system according to the invention in a first system condition.

FIG. 2 is a cross-sectional view of a second camera system according to the invention. A camera 6 is again provided for monitoring a field of view 8 in the rear space of a motor vehicle. Also, the components bearing the reference numbers 1, 1*a*, 2, 4, 5, 11, 12 essentially correspond to those of FIG. 1, and fulfill corresponding functions in the case of the camera system illustrated in FIG. 2.

In the second embodiment described here of a camera system according to the invention, the deflection mirror structurally coupled with the proprietary symbol 1 is divided into two mirror surfaces 3*a* and 3*b*. By swiveling the proprietary symbol 1 about the axis of rotation 4, it can be adjusted which of the two mirror surfaces directs incident light to the camera; i.e., which of the two mirror surfaces is "active". In the swivel position illustrated in FIG. 2, the first mirror surface 3*a* is active. Its curvature causes a relatively wide-angled view of the rear space of the vehicle. The arrow lines 7*a* illustrate the resulting wide-angled field of view 8*a*.

The axis of rotation 4 extends perpendicular to the longitudinal axis of the vehicle. In this manner, a view is obtained that is oriented toward the rear essentially along the longitudinal axis of the vehicle. This view is suitable for a functioning of the camera as a reversing camera. The system condition illustrated in FIG. 2 is therefore called a "wide-angle reversing camera" system condition.

Figure 3:
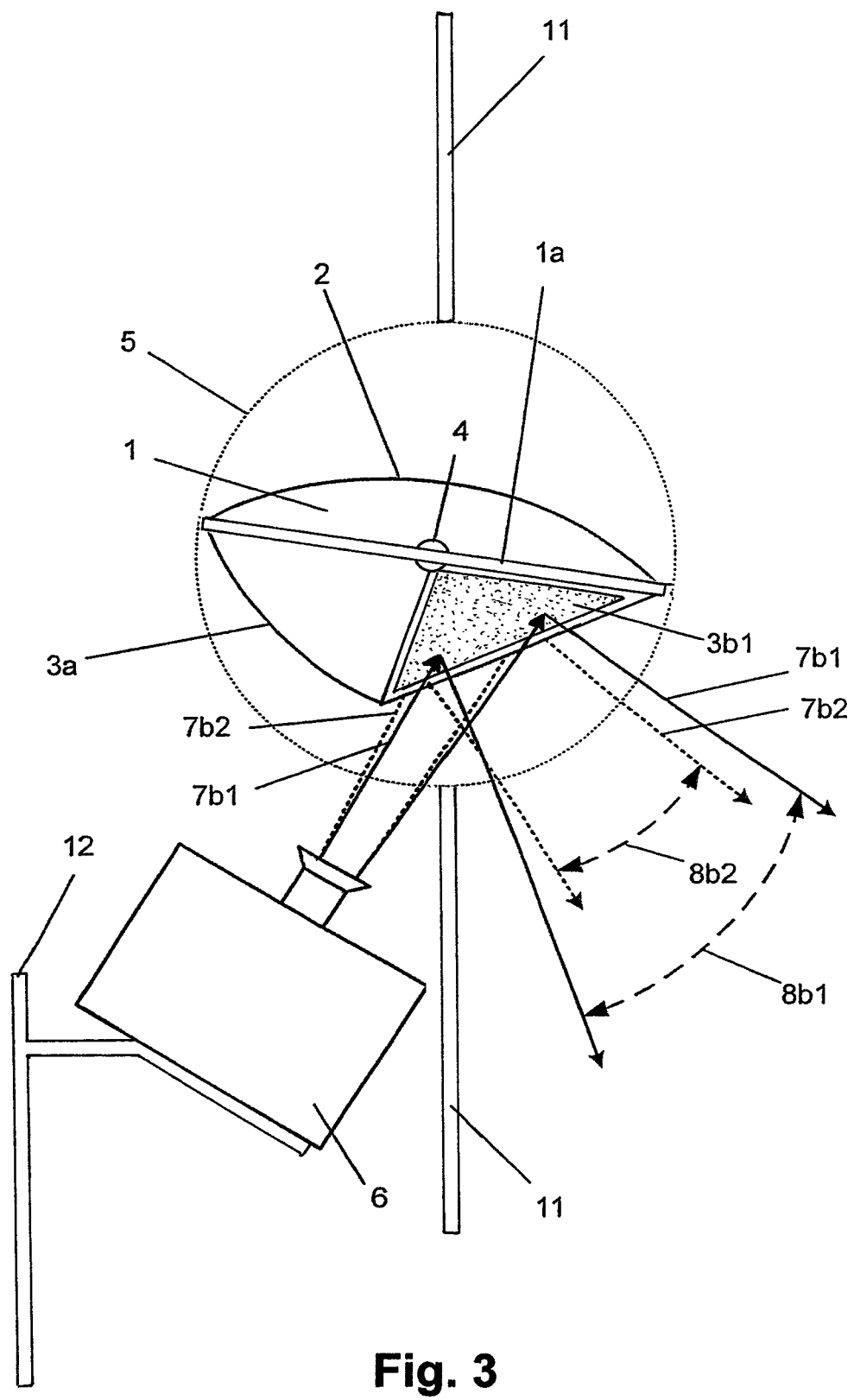
FIG. 3 is a schematic cross-sectional view of the second camera system according to the invention in a second system condition.

FIG. 3 is a cross-sectional view of the camera system illustrated in FIG. 2 in a second system condition. The system condition illustrated in FIG. 3 is called a "combined picture of two lateral views" system condition. The system conditions of FIG. 2 and FIG. 3 differ from one another essentially with respect to the swivel position of the proprietary symbol 1 and the resulting different fields of view 8*a* or 8*b*1 and 8*b*2.

The mirror surface active according to FIG. 3 is composed of two partial surfaces 3*b*1 and 3*b*2. In the view according FIG. 3, the partial surface 3*b*1 is in the foreground and the partial surface 3*b*2 is in the background. The curvature of the two partial surfaces 3*b*1 and 3*b*2 and their alignment in the swivel position illustrated in FIG. 3 result in the fact that light is reflected from two, non-mutually adjoining, fields of view 8*b*1 and 8*b*2 simultaneously into the camera 6.

In FIG. 3, the arrow lines 7*b*1 and 7*b*2 respectively illustrate the resulting fields of view 8*b*1 and 8*b*2 respectively. The field of view 8*b*1 corresponds to a lateral view oriented toward the left (in the longitudinal direction of the vehicle). The field of view 8*b*2 corresponds to a lateral view oriented toward the right.

The reflection of the two lateral views into the camera 8 takes place without overlapping such that the camera 6 supplies a picture divided into two parts. One half of the picture shows the left lateral view, and the other half of the picture shows the right lateral view.

The combined image taken by the camera can be displayed directly to the driver of the motor vehicle. As required, the two image halves may also be separated by suitable image processing methods.

In addition to the two system conditions illustrated in FIGS. 2 and 3, the camera system may also be changed to the "image side to the vehicle exterior, camera off" system condition, which is not graphically shown separately. When the image side 2 faces outward, the proprietary symbol closes the opening in the outside panel 11. The camera 6 and the deflection mirror on the backside of the proprietary symbol are protected from all environmental influences. This system condition can always be initiated when no image from the camera 6 is needed. The camera 6 can then be switched off.

Figure 4:
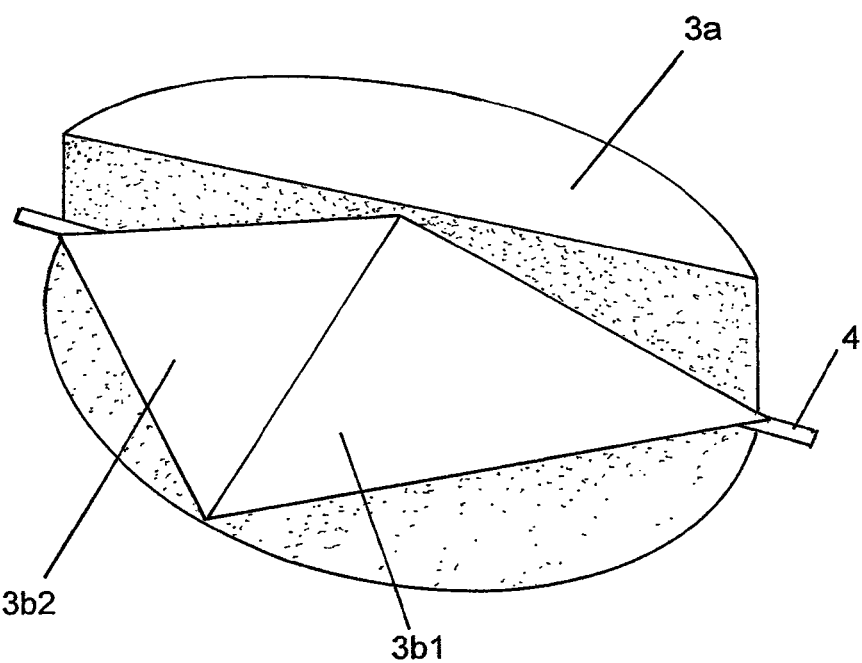
FIG. 4 is a schematic view of a deflection mirror coupled according to the invention with the proprietary symbol and having two mirror surfaces.

FIG. 4 illustrates a deflection mirror coupled, according to the invention, with a proprietary symbol having two mirror surfaces. This is the same proprietary symbol 1 and the same deflection mirror respectively as in FIG. 2 and FIG. 3. The first mirror surface 3a is active in the "wide angle reversing camera" system condition according to FIG. 2. The two-part mirror surface 3b1+3b2 assembled of the surface parts 3b1 and 3b2 is active in the "combined picture of two lateral views" system condition according to FIG. 3.

The structural coupling of the deflection mirror to the proprietary symbol is constructed such that the deflection mirror can be detached from the proprietary symbol. This has different advantages. On the one hand, a damaged deflection mirror can very easily be exchanged. On the other hand, different types of deflection mirrors can be coupled to such a proprietary symbol. Depending on the embodiment of the deflection mirror, very different optical images and thus different picture-taking functions can be achieved. For a motor vehicle manufacturer, this has the advantage that different variations of camera-based driver assistance systems can be implemented, which are each based on the invention and differ only with respect to the construction of the deflection mirror and possibly of the image processing coupled on the output side. The entire remaining camera system and its constructive integration in the vehicle can otherwise remain unchanged. Different product variants can thereby be provided and offered at minimal additional cost.

Approximately the same advantage is obtained when the proprietary symbol, together with the deflection mirror, is provided in different variants which differ only with respect to the construction of the deflection mirror. In that case, the proprietary symbol together with the deflection mirror then only has to be exchanged for a different proprietary symbol in order to be able to cause different optical imaging functions.

Figure 5:
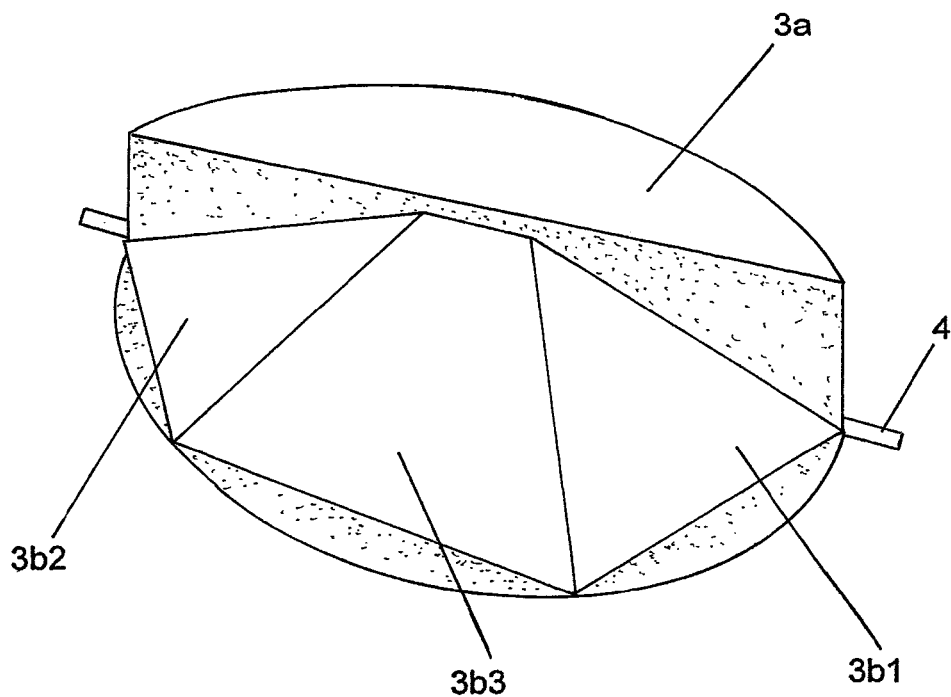
FIG. 5 is a schematic view of an alternative embodiment of a deflection mirror coupled according to the invention with a proprietary system and having two mirror surfaces.

FIG. 5 illustrates an alternative embodiment of a deflection mirror coupled according to the invention with a proprietary symbol and having two mirror surfaces.

The first mirror surface 3a corresponds to that of the deflection mirror of FIG. 4. It can correspondingly analogously be used in a "wide angle reversing camera" system condition according to FIG. 2.

In contrast to the second mirror surface of the deflection mirror according to FIG. 4, the second mirror surface of the deflection mirror according to FIG. 5 is constructed in three parts; that is, assembled of three surface parts 3b1, 3b2 and 3b3. The surface parts 3b1 and 3b2 have a construction similar to that of the deflection mirror according to FIG. 4. In contrast, the surface part 3b3 is suitable—when the deflection mirror analogous to FIG. 3 is used—for reflecting a wide-angled field of view situated just behind the motor vehicle.

By means of the deflection mirror according to FIG. 5—when the deflection mirror analogous to FIG. 3 is used—for example, the fields of view illustrated in FIG. 6 in a top view can therefore be covered. As a result of the multipart construction of the mirror surface 3b1+3b2+3b3, all three fields of view R, L, RFK can simultaneously be imaged by the camera 6. In this case, when the deflection mirror analogous to FIG. 3 is used, the field of view L corresponds to the surface part 3b1; the field of view R corresponds to the surface part 3b2; the field of view RFK corresponds to the surface part 3b3.

Since, as described above, the deflection mirror can advantageously be detached from the proprietary symbol, a deflection mirror according to FIG. 4 can very easily be replaced by a deflection mirror according to FIG. 5. Should it be required that the image processing method connected to the output side be correspondingly adapted, as a result, completely different fields of view than those illustrated in FIG. 6 can also be easily covered.

In the representation according to FIG. 6, the fields of view L, R, and RFK adjoin one another. This facilitates the user's orientation in the case of an immediate output of the taken camera image but is not absolutely required.

As required, the parts of the camera image corresponding to the individual fields of view can also be separated by suitable image processing methods. FIGS. 7a, 7b and 7c illustrate different variants according to which an image output of the taken image data can then take place on a monitor in the vehicle interior.

The representation according to FIG. 7a shows only the images of the two lateral views; i.e., of the fields of view L and R, together with a map detail of a navigation system.

The representation according to FIG. 7b shows only the image of the reversing camera view, i.e., of the field of view RFK, also together with a map detail of a navigation system.

The representation according to FIG. 7c shows the images of all three fields of view L, R and RFK.

The change-over between the illustrated variants of the image output according to FIG. 7a, 7b or 7c can be caused, for example by an operating action by the vehicle driver. It can also take place automatically, for example, by way of a gear position or of the vehicle speed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A camera system for a motor vehicle, comprising:
a swivelable decorative part of the motor vehicle, wherein the decorative part comprises a decorative side of an essentially flat carrier plate that swivels between at least a first stable swiveling position and a second stable swiveling position;
a deflection mirror structurally coupled to the essentially flat carrier plate of the swivelable decorative part situated opposite the decorative side of the decorative part; and
a camera operatively mounted on the vehicle such that when the decorative part is in the second stable swiveling position, the decorative side of the decorative part is turned to an exterior of the motor vehicle so as to physically partition the camera from the exterior of the vehicle, and when the decorative part is in the first stable swiveling position, the deflective mirror is turned to the exterior of the motor vehicle,
wherein the camera is further operatively mounted such that incident radiation is directed via the deflection mirror to the camera when the decorative part is in the first stable swiveling position.

2. The camera system according to claim 1, wherein the decorative part is a proprietary symbol.

3. The camera system according to claim 1, wherein the deflection mirror has a curved design corresponding to a defined optical imaging function.

4. The camera system according to claim 1, wherein a change of a swivel position of the decorative part causes a change of an optical imaging via the deflection mirror.

5. The camera system according to claim 1, wherein the decorative part is swivelable into at least three distinct defined swivel positions.

6. The camera system according to claim 1,
wherein the deflection mirror structurally coupled to the decorative part comprises a first mirror surface for deflecting incident radiation and a second mirror surface for deflecting incident radiation; and
wherein the decorative part is swivelable for optionally directing the incident radiation from the first or the second mirror surface to the camera.

7. The camera system according to claim 6, wherein the second mirror surface has a curvature course differing from a curvature course of the first mirror surface.

8. The camera system according to claim 1,
wherein the deflection mirror is operatively configured such that only a cutout of its surface is required for deflecting the incident radiation to the camera;
wherein, as a result of a change of the swivel position of the decorative part, a changed cutout of the surface of the deflection mirror directs the incident radiation to the camera; and
further wherein the surface of the deflection mirror is constructed such that via different cutouts of the surface of the deflection mirror different optical images are achievable.

9. A component of a camera system for a motor vehicle, comprising:
a decorative part arrangeable on an exterior of the motor vehicle, the decorative part comprising a proprietary symbol arranged on a side of an essentially flat carrier plate and a deflection mirror arranged on an opposite side surface of the essentially flat carrier plate;
wherein the decorative part is operatively configured to be swivelable when arranged on the motor vehicle between at least a first stable swiveling position and a second stable swiveling position, and
wherein the proprietary symbol is turned to an exterior of the motor vehicle so as to physically partition the camera from the exterior of the vehicle when the decorative part is in the second stable swiveling position,
wherein the deflection mirror is turned to the exterior of the motor vehicle when the decorative part is in the first stable swiveling position, and
wherein the camera is operatively mounted such that incident radiation is directed via the deflection mirror to the camera when the decorative part is in the first stable swiveling position.

10. The component according to claim 9, wherein the deflection mirror comprises first and second mirror surfaces for deflecting incident radiation, the first and second mirror surfaces being different from one another.

11. The camera system according to claim 1, wherein the deflective mirror is turned from an interior of the motor vehicle to the exterior of the motor vehicle as the decorative part moves from the second stable swiveling position to the first stable swiveling position.

12. The camera system according to claim 11, wherein the carrier plate of the decorative part is swivelably mounted to and within an essentially common plane of an outside panel of the motor vehicle, wherein the outside panel defines a boundary between the interior and the exterior of the motor vehicle.

13. The camera system according to claim 12, wherein the outside panel is part of a tailgate of the motor vehicle.

14. The camera system according to claim 13, wherein the camera is mounted within the tailgate of the motor vehicle.

15. The component according to claim 9, wherein the deflective mirror is turned from an interior of the motor vehicle to the exterior of the motor vehicle as the decorative part moves from the second stable swiveling position to the first stable swiveling position.

16. The component according to claim 15, wherein the carrier plate of the decorative part is swivelably mounted to and within an essentially common plane of an outside panel of the motor vehicle, wherein the outside panel defines a boundary between the interior and the exterior of the motor vehicle.

17. The component according to claim 16, wherein the outside panel is part of a tailgate of the motor vehicle.

18. The component according to claim 17, wherein the wherein the camera is mounted within the tailgate of the motor vehicle.

* * * * *